United States Patent [19]

Bott et al.

[11] Patent Number: 5,319,027

[45] Date of Patent: * Jun. 7, 1994

[54] MISCIBLE BLENDS OF VINYL ACETATE-ETHYLENE COPOLYMERS AND COPOLYMERS OF ACRYLIC ACID OR MALEIC ANHYDRIDE

[75] Inventors: Richard H. Bott, Macungie, Pa.; Jeffrey A. Kuphal, Flemington, N.J.; Lloyd M. Robeson, Macungie, Pa.; Hsueh-Chi Lee, Allentown, Pa.; Cajetan F. Cordeiro, Kutztown, Pa.

[73] Assignee: Air Products and Chemicals, Inc., Allentown, Pa.

[*] Notice: The portion of the term of this patent subsequent to Dec. 15, 2010 has been disclaimed.

[21] Appl. No.: 921,535

[22] Filed: Jul. 29, 1992

Related U.S. Application Data

[63] Continuation-in-part of Ser. No. 633,830, Dec. 26, 1990, Pat. No. 5,171,777.

[51] Int. Cl.⁵ .................. C08L 33/02; C08L 33/08; C08L 25/08; C08L 31/04
[52] U.S. Cl. .................. 525/221; 525/301; 525/285; 525/207
[58] Field of Search ............... 525/207, 285, 221, 301

[56] References Cited

U.S. PATENT DOCUMENTS

| | | | |
|---|---|---|---|
| 3,957,908 | 5/1976 | Heslinga et al. | 525/207 |
| 4,332,917 | 6/1982 | Heslinga et al. | 525/207 |
| 4,338,417 | 6/1982 | Heslinga et al. | 525/207 |
| 4,598,118 | 7/1986 | Hansen et al. | 525/207 |
| 4,657,975 | 4/1987 | Kodama et al. | 525/207 |
| 4,692,498 | 9/1987 | Bodolus et al. | 525/285 |
| 4,855,363 | 8/1989 | Moteki | 525/207 |
| 4,985,504 | 1/1991 | Siol | 525/206 |
| 5,171,777 | 12/1992 | Kuphal et al. | 525/221 |

FOREIGN PATENT DOCUMENTS

| | | | |
|---|---|---|---|
| 147850 | 4/1981 | German Democratic Rep. | 525/207 |
| 56-050970 | 5/1981 | Japan | 525/207 |
| 56-092945 | 7/1981 | Japan | 525/207 |
| 58-069274 | 4/1983 | Japan | 525/221 |

*Primary Examiner*—Carman J. Seccuro, Jr.
*Attorney, Agent, or Firm*—Keith D. Gourley; James C. Simmons; William F. Marsh

[57] ABSTRACT

Polymeric compositions are disclosed containing miscible blends of copolymers, one of which is a vinyl acetate/ethylene copolymer containing about 5 to 30 weight percent ethylene and the other is a copolymer of either acrylic acid or a maleic anhydride with a comonomer selected from styrene, ethyl acrylate, n-butyl acrylate and 2-ethylhexyl acrylate. Windows of miscibility for each of the copolymer blends have been defined and the blends can be advantageously formed by polymerizing the acrylic acid copolymer in the presence of an emulsion of the vinyl acetate/ethylene copolymer in such a way that the polymerization takes place in the suspended vinyl acetate/ethylene copolymer rather than in the aqueous phase.

9 Claims, No Drawings

MISCIBLE BLENDS OF VINYL ACETATE-ETHYLENE COPOLYMERS AND COPOLYMERS OF ACRYLIC ACID OR MALEIC ANHYDRIDE

CROSS REFERENCE TO RELATED APPLICATIONS

This application is a continuation-in-part of Application Ser. No. 07/633,830, filed Dec. 26, 1990 which issued as U.S. Pat. No. 5,171,777 on Dec. 15, 1992.

FIELD OF THE INVENTION

This invention relates to miscible blends of copolymers of vinyl acetate and ethylene with other copolymers containing acrylic acid or maleic anhydride. In another aspect the invention relates to a method of forming such miscible blends by polymerizing acrylic acid or maleic anhydride in the presence of emulsified vinyl acetate-ethylene copolymer.

BACKGROUND OF INVENTION

As uses for polymeric compositions have become more sophisticated, the demand has grown for polymers and polymer mixtures having physical properties tailored to the desired end use. Vast numbers of polymeric systems having 2, 3 or more monomers have been developed in order to achieve certain balances of properties. The degree that such properties can be controlled becomes increasingly complex as the number of different monomers in such systems increases. It has become more practicable, therefore, to modify and tailor polymer properties by combining preformed polymers of known composition and behavior in mixtures or blends. As the general rule, however, polymers which differ from each other significantly in composition are incompatible and do not mix well in a manner which enables them to share their properties or enhance the properties of one of the base polymers. Basically, this incompatibility results because the polymers do not combine on a molecular level which would be the case if the polymers were completely miscible with each other.

The miscibility between polymers has been studied extensively, as by Olabisi, et al, "Polymer-Polymer Miscibility", *Academic Press*, New York, (1979). The authors describe blends of miscible polymers which exhibit behavior similar to that which would be expected from a single phase system. This offers assurance of mechanical compatibility with enhanced tensile properties, noting that miscible polymer blends are usually useful over the entire composition range of components thereby offering great versatility in matching price/performance requirements.

The problem of blending normally incompatible polymers was addressed several years earlier by Murdock, et al., U.S. Pat. No. 3,236,914 (1966). The solution offered was to combine one linear polymer containing nitrogen atoms with another linear polymer having carboxylic acid groups, for example vinyl pyridine and acrylic acid or methacrylic acid. The so-called "neutral" comonomers could be selected from a long list of polymers including styrene and vinyl chloride or butadiene and methyl methacrylate.

Over two decades later, the problem of polymer miscibility was addressed in a similar fashion by Hsieh and Wong, *J. Chem. I. Ch. E.*, 19(1), 17(1988) who studied phase separation between poly(vinyl acetate) and polystyrene. Miscibility was noted for copolymers based upon vinyl acetate/acrylic acid and styrene/4-vinyl pyridine. Also studied were blends of copolymers of styrene with acrylic acid and styrene with vinyl pyridine. The interaction between the polymer chains was said to be enhanced by introducing charge groups, namely the vinyl pyridine and acrylic acid into the system. The single phase was noted at 10% content of the charge groups with improved compatibility and a Tg of the blend centered between the Tg of the component copolymers at 30 mole percent of the charge group monomer. The reference teaches that each of the polymers of the blend must have one of the charge group monomers in its composition.

U.S. Pat. No. 4,332,917, Heslinga, et al., (1982) describes polymer alloys formed from one or more polymers having anhydride groups and one or more polymers able to hydrogen bond to the first polymer which must be protolyzed, for example, a copolymer of styrene and maleic anhydride and poly(vinyl acetate). These polymers are said to be miscible in all proportions at certain temperatures but at specific temperatures phase separation will take place. Physical interaction between the polymers is said to be improved by protolysis of the maleic anhydride portion of the copolymer in order to increase hydrogen bonding. This must be done after the polymer is in solution in an organic solvent. Relative proportions of the styrene and maleic anhydride are not disclosed but one example indicates that about equal amounts were charged to a polymerization.

Shiomi, et al., *Macromolecules*, 19, 2274 (1986) states that compatibility between high molecular weight polymers is unusual in blend systems, but that specific interaction between two polymers does improve the potential for miscibility. The authors studied random copolymer blends in which the blended copolymer had a common monomer, for example, vinyl acetate/ethylene and vinyl chloride/vinyl acetate copolymers. Another system studied was the copolymer of styrene and maleic anhydride blended with a copolymer of styrene and acrylonitrile.

Many polymer blends are disclosed in the literature without actually addressing the problem of compatibility. For example Japanese Patent Application 60042476 (1985) describes vibration proof materials which include fiber and resin made from vinyl acetate/ethylene copolymer and a styrene copolymerized with acrylic acid ester with a third monomer of acrylic acid being optional. The compositions disclosed are, however, outside the range of miscibility with vinyl acetate/ethylene copolymer (VAE). In like manner Japanese Patent Application 62070461 (1987) describes a varnish containing VAE having 10 to 40 weight percent ethylene and a copolymer of styrene with maleic acid, the VAE being in emulsion and the styrene copolymer in solution. In effect, this system would produce a mixture of emulsions so that the resultant cast film would consist of particles of VAE surrounded by the styrene resin and therefore would be phase separated. Also, U.S. Pat. No. 4,777,197, Nolken, et al. (1988) describes as a plastic dispersion a mixture of VAE containing 14 to 22% ethylene and a copolymer of styrene with maleic anhydride as a water soluble salt plus a dispersing agent. Since the dispersion would contain particles of the poly(vinyl ester), mixing would not occur on the molecular level.

Cruz-Ramos, et al., *Macromolecules*, 22, 1289 (1989) discloses that poly(vinyl chloride) is not miscible with either poly(vinyl acetate) or polyethylene, but does form miscible mixtures with some of the copolymers of vinyl acetate and ethylene containing about 15–55 weight percent ethylene. The authors discuss "miscibility windows" in homopolymer-copolymer blends, but do not go beyond the studies made with poly(vinyl chloride).

BRIEF DESCRIPTION OF THE INVENTION

We have discovered that certain miscibility windows exist for copolymers of vinyl acetate and ethylene and certain copolymers of acrylic acid or maleic anhydride. Miscibility of these copolymers appears to be very sensitive to the relative proportions of the monomers which exist in each copolymer, but if miscible blends form, then the miscibility of the two copolymers extends over a broad range of blend compositions, for example from about 10 to 90 parts by weight of the vinyl acetate-ethylene copolymer (VAE) and 90 to 10 parts by weight of the acrylic acid or maleic anhydride copolymer.

The VAE copolymers which participate in this miscibility potential are the polymers having a relatively low ethylene content in the range of about 5 to 30 weight percent ethylene. The acrylic acid or maleic anhydride copolymer is one of the copolymers selected from (a) a styrene polymer containing 8 to 30 weight percent acrylic acid or maleic anhydride, (b) an ethyl acrylate polymer containing 8 to 25 weight percent acrylic acid, (c) an n-butyl acrylate polymer containing 10 to 25 weight percent acrylic acid or maleic anhydride, or (d) a 2-ethylhexyl acrylate polymer containing 18 to 25 weight percent acrylic acid.

These miscible polymer blends in the compositions indicated above can be formed by a number of methods such as direct mixing or milling of the preformed polymers such as in a Brabender, but one very convenient method of forming the blends is to polymerize the acrylic acid or maleic anhydride copolymer in an emulsion of the preformed VAE. The VAE particles of the emulsion are believed to be swollen by the acrylic acid or maleic anhydride and the comonomer which can be either styrene, ethyl acrylate, n-butyl acrylate, 2-ethylhexyl acrylate or combinations thereof so that polymerization and mixing takes place on the molecular scale.

A preferred composition is a miscible blend of VAE copolymer having an ethylene content of 10 to 35 weight percent and a styrene/acrylic acid copolymer having an acrylic acid content of 8 to 32 weight percent.

DETAILED DESCRIPTION OF THE INVENTION

The polymeric compositions of this invention contain blends of vinyl acetate/ethylene copolymers which have been described by Daniels, *Encyclopedia of Polymer Science and Engineering*, Vol. 17, p. 393–425, John Wiley and Sons, New York (1989) as the high vinyl acetate copolymer, generally containing about 70 to 90 weight percent vinyl acetate. These polymers can be made as described by Daniels via emulsion polymerization under an ethylene pressure of about 300 to 750 psi, although higher pressures on the order of 1800 psi are sometimes used. Protective colloids, surfactants, and stabilizers employed to maintain a stable emulsion or suspension may also be present. Such polymers are commercially available and find a wide range of utility as adhesives and coating materials.

This invention enables the modification of such VAE polymers by incorporating by a blending within windows of miscibility certain polymers of acrylic acid or maleic anhydride which are copolymerized with either styrene, ethyl acrylate, n-butyl acrylate, 2-ethylhexyl acrylate, or mixtures of such comonomers. The development of such miscible blends is very significant because such monomer mixtures cannot be copolymerized readily. Attempts to do so have yielded highly heterogeneous mixtures since styrene, acrylates and acrylic acid are much more reactive and will polymerize preferentially to vinyl acetate and ethylene. Styrene is also known to inhibit the polymerization of vinyl acetate. The result is a blend of polymers varying in composition and which have physical properties which are unpredictable. Most likely the polymers will be phase separated and exhibit mechanical incompatibility generally observed with phase separated polymers. Trying to control composition by starve feeding the reactive monomers to a copolymerization can be difficult to control or reproduce on an industrial scale.

A comparable objective can be attained, however, by blending the polymers having the compositions indicated in accordance with this invention. The acrylic acid and maleic anhydride copolymers can be prepared by typical polymerization processes using free radical polymerization, either in bulk, suspension or solution or emulsion polymerization. The preparation of acrylates including acrylic acid and maleic anhydride is discussed by Saunders "Inorganic Polymer Chemistry", Chapter 6, Chapman and Hall, London (1973).

Styrene can be copolymerized with acrylic acid and maleic anhydride by free radical polymerization and the reactivity ratio data for these monomers indicates a tendency to form copolymers rather than homopolymers in the presence of each other. As noted by Odian, "Principles of Polymerization", Second Edition, page 450–452, Wiley-Interscience, New York (1981).

The blends of this invention can be made by procedures which include melt mixing, for example in an extruder or on a mill, solution blending in a common solvent followed by devolatilization or by in-situ polymerization of the acrylic acid or maleic anhydride polymer in the presence of the VAE emulsion.

The VAE polymers used in this invention normally have an ethylene content in the range of 5–30 weight percent, but when blended with a styrene/acrylic acid copolymer having about 8 to 32 weight percent acrylic acid, a preferred ethylene content is of about 10 to 35 weight percent for the VAE. It was surprising to find these windows of miscibility with the VAE polymer which, contrary to the general teaching of the prior art, enjoys miscibility with the second comonomer, even without containing a charge group as described by Hsieh and Wong or without a common monomer between the two copolymers which are blended.

While Applicants wish not to be bound by a particular theory, the selective miscibility observed results from a combination of both attractive and repulsive forces existing between the monomer units in each copolymer and between the copolymers. Nevertheless, there is nothing in the prior art which would have led directly to producing these miscible polymer blends, particularly in view of the fact that a majority of similar copolymers are not miscible and demonstrate incompatibility with each other. For example, the VAE's are incompatible with copolymers of methyl acrylate and acrylic acid over a wide range of proportions. A methyl acrylate/acrylic acid copolymer containing 10 weight percent acrylic acid is, however, miscible with poly(vinyl acetate), so that with this particular acrylic acid copolymer a small amount of ethylene in the VAE negates miscibility. Also, substitution of methacrylic acid for acrylic acid destroys miscibility, even in compositions that would otherwise demonstrate complete mixing on the molecular scale. Methacrylic acid, however, can be employed as a third monomer in the copolymers of this invention up to an amount where miscibility is no longer maintained.

Copolymers which have been observed to be miscible with the VAE having ethylene contents in the ranges indicated include a styrene copolymer containing 8 to 30 weight percent of acrylic acid or maleic anhydride, and ethyl acrylate copolymer containing 8 to 25 weight percent of acrylic acid, and n-butyl acrylate polymer containing 10 to 25 weight percent of acrylic acid or maleic anhydride, or a copolymer of 2-ethylhexyl acrylate containing 14 to 25 weight percent acrylic acid or maleic anhydride.

A preferred set of compositions include a VAE polymer which contains from 6 to 25 weight percent ethylene and such polymers can be blended to form miscible compositions with a copolymer of ethyl acrylate and acrylic acid containing 10 to 15 weight percent acrylic acid or a copolymer of n-butyl acrylate containing 18 to 25 weight percent acrylic acid or a copolymer of 2-ethylhexyl acrylate containing 18 to 25 weight percent acrylic acid.

The term 'copolymer' as it is used with respect to the acrylic acid or maleic anhydride polymer, includes terpolymers in which minor amounts of other monomers of the same type as indicated for the other miscible polymers can be present. For example, a styrene copolymer with acrylic acid could also contain 2-ethylhexyl acrylate. In similar fashion, terpolymers containing the acrylic acid or maleic anhydride and monomers selected from styrene, ethyl acrylate, n-butyl acrylate or 2-ethylhexyl acrylate can be used to modify the properties of VAE polymers in miscible blends. Other monomers or combinations of monomers not specifically mentioned can be added at minor levels (<10 wt %) such as methacrylic acid, methyl acrylate, vinyl acetate, ethylene, maleic acid, vinyl chloride, isoprene, methyl methacrylate and mixtures thereof such that miscibility is still maintained. Additionally, acrylic acid and maleic anhydride can be incorporated into the 'copolymer' along with the desired styrene or acrylate monomers listed herein.

In order to illustrate further the features of our invention, the following examples are presented which should not be construed to limit our invention unduly.

COMPARATIVE EXAMPLES

Melt blends of a vinyl acetate-ethylene copolymer (VAE) (30% ethylene Tg=−9° C., obtained from Scientific Polymer Products) were prepared with polystyrene, poly(methyl acrylate) and poly(ethyl acrylate). The polystyrene was obtained from Aldrich Chemical Co. and had a molecular weight of 250,000. Poly(methyl acrylate) was obtained from Scientific Polymer Products and had a molecular weight of 43,000. Poly(ethyl acrylate) was obtained from Scientific Polymer Products and had a molecular weight of 95,000.

The blends were prepared in a Brabender under the conditions noted in Table 1 along with mixture observations.

TABLE 1

| Example | Blend | Brabender Temperature of Mixing | Blend Appearance |
|---|---|---|---|
| 1 | 50% VAE 50% Polystyrene | 175–180° C. | Opaque - two phase |
| 2 | 50% VAE 50% Poly(ethyl acrylate) | 70–90° C. | Translucent - two phase |
| 3 | 50% VAE 50% Poly(methyl acrylate) | 70–90° C. | Opaque - two phase |

The polystyrene/VAE blend was compression molded into a 40 mil thick 4"×4" plaque at 170° C. This sample was subjected to dynamic mechanical testing over a broad temperature range using a Rheometrics RMS-605 mechanical spectrometer at a frequency of 1 Hz. Two glass transition temperatures corresponding to the individual constituents were observed (−6° C., 114° C.). The mechanical properties were quite poor as noted below:

| | |
|---|---|
| Tensile Modulus | 40,000 psi |
| Tensile Strength | 850 psi |
| % Elongation | 20% |

The mechanical properties were determined on shear cut ⅛" wide, 20 mil thick specimens using an Instron Tester and a procedure similar to ASTM D-638 adapted to small scale testing. These comparative Examples 1–3 show that VAE does not form miscible blends with homopolymers of styrene, methyl acrylate or ethyl acrylate.

EXAMPLES 4–7

Styrene/acrylic acid copolymers utilized for the blends in subsequent examples were prepared via bulk reaction in an extruder. The relevant data for the four copolymers are listed in Table 2. Glass transition temperatures were determined via differential scanning calorimetry using a Perkin-Elmer DSC-2C at a heating rate of 10° C./minute. The Tg data corresponds to the midpoint values obtained from the baseline shift at the transition during a second heating scan. Weight average molecular weights were determined at 25° C. in tetrahydrofuran at a flow rate of 1.0 ml/minute via gel permeation chromatography. A non-universal calibration relative to the retention times of narrow distribution polystyrene standards was employed. Melt flow data was obtained using a Tinius-Olsen Melt Indexer similar to a procedure described in ASTM D-1238. Melt flow values in Table 2 were determined after ten minutes (MF10) and thirty minutes (MF30) preheats at conditions of 200° C. and 44 psi.

TABLE 2

| Example | Styrene/Acrylic Acid Feed Ratio (by wt) | Mw | Tg (°C.) | MF 10 (dg/min) | MF30 (dg/min) |
|---|---|---|---|---|---|
| 4 | 92/8 | 86,000 | 125 | 6.74 | 7.27 |
| 5 | 86/14 | 83,000 | 137 | 2.93 | 2.97 |
| 6 | 82/18 | 183,000 | 139 | 0.68 | 0.66 |
| 7 | 80/20 | 71,000 | 142 | 5.03 | 5.02 |

EXAMPLES 8-16

A series of acrylate/acrylic acid copolymers were polymerized via bulk reaction in an extruder or by solution polymerization. The compositions and property data are listed in Table 3. Inherent viscosities (IV) were determined at 25° C. in tetrahydrofuran using a 0.2 wt % solution. Glass transition temperatures were determined via differential scanning calorimetry as noted in Examples 4-7.

TABLE 3

| Example | Description | Feed Ratio | Composition (wt %) | IV (dl/g) | TG (°C.) |
|---|---|---|---|---|---|
| 8 | EA/AA | 86/14 | — | 0.48 | 7 |
| 9 | EA/AA | 92/8 | 93/7 | 0.92 | 1 |
| 10 | EA/AA | 75/25 | 77/23 | 0.81 | 31 |
| 11 | EA/AA | 65/35 | 68/32 | 1.02 | 55 |
| 12 | MMA/ n-BMA/ MAA | 30/50/20 | — | | |
| 13 | MMA/ n-BMA/ MAA | 26.5/43.5/30 | — | | |
| 14 | MMA/ n-BMA/ MAA | 22.5/37.5/40 | — | | |
| 15 | n-BA/ MA/AA | 40/40/20 | 42/40/18 | 0.92 | 28 |
| 16 | n-BA/Man | 85/15 | — | | −22 |

EA = ethyl acrylate
AA = acrylic acid
MMA = methyl methacrylate
n-BMA = n-butyl methacrylate
MA = methyl acrylate
Man = maleic anhydride
MAA = methacrylic acid
n-BA = n-butyl acrylate Applicants note that the feed ratios of monomers in these runs corresponds very closely to the actual composition of the copolymer products.

EXAMPLES 17-20

Melt blends of a vinyl acetate-ethylene copolymer (70% vinyl acetate) obtained from Scientific Polymer Products, Inc. were prepared with the styrene/acrylic acid copolymers (S/AA) described in Examples 4-7. These blends were prepared in a Brabender at 170°-190° C. The resultant blends were compression molded at 160°-180° C. into 20 mil and 40 mil plaques for calorimetric, mechanical, and dynamic mechanical characterization as described in Examples 4-16. The results on these blends are noted in Table 4. The styrene/2-ethylhexyl acrylate/acrylic acid terpolymer (S/2-EHA/AA) blend data with VAE are also included. The S/2-EHA/AA was prepared via extrusion polymerization. These miscible blends exhibited significantly higher tensile strength and elongation at break than the immiscible polystyrene/VAE of the comparative Example 1. This is one objective of the invention. Also, a single Tg indicates mixing at the molecular scale. Emulsion or dispersion blends do not achieve the advantages achieved with mixing at the molecular level.

TABLE 4

| Example | Sample Description | Tensile Modulus (psi) | Tensile Strength (psi) | Elongation @ Break % | Tg(DSC) (°C.) | Tg(DMS) (°C.) |
|---|---|---|---|---|---|---|
| 17 | 50% S/AA (20% AA) 50% VAE (70% VAc) | 145,000 | 5,200 | 79 | 47 | — |
| 18 | 50% S/AA (14% AA) 50% VAE (70% VAc) | 124,000 | 4,700 | 175 | 33 | 69 |
| 19 | 50% S/AA (8% AA) 50% VAE (70% Vac) | 91,000 | 3,500 | 150-260 | 29 | 61 |
| 20 | 50% S/2-EHA/AA 60/15/25 50% VAE (70% VAc) | 83,000 | 3,800 | 240 | — | 78 |

S = styrene
AA = acrylic acid
VAE = vinyl acetate-ethylene
VAc = vinyl acetate
2-EHA = 2-ethyl hexyl acrylate In the parent application Ser. No. 07/633,830 referenced above, Examples 31 and 32 show immiscibility between poly(vinyl acetate) and styrene/acrylic acid copolymers containing 8 and 14 wt % acrylic acid while Example 34 showed miscibility when the acrylic acid content of the S/AA copolymer reached 18 wt %. The miscibility of VAE with S/AA over a broad range of AA content was quite unexpected. Example 20 shows that a minor amount of one of the selected monomers can be introduced as a termonomer without destroying miscibility.

EXAMPLES 21-24

Two additional styrene/acrylic acid copolymers were prepared by solution polymerization (in tert-butanol at 30% monomer concentration). Benzoyl peroxide (2.0 mmoles/mole monomers) was added to the reaction mixture which was then purged with nitrogen for 10-15 min and heated to 80° C. for 16-20 hours. In the early stages of the reaction, an ice bath was used to moderate the exotherm. The resulting polymer was isolated by precipitating in water and drying in a vacuum over (60° C./1 torr). After drying, monomer conversion to polymer was measured, and the inherent viscosity (25° C. using a 0.2 wt % solution in tetrahydrofuran), and the composition (using $^{13}C$ NMR of the polymer products) were determined. The characteristics of these polymers is noted in Table 5.

TABLE 5

| Example | Styrene/Acrylic Acid Feed Ratio | Conversion (%) | Composition (wt %) | IV (dl/g) | Tg (°C.) |
|---|---|---|---|---|---|
| 21 | 70/30 | 89 | 78/22 | 0.48 | 130 |
| 22 | 60/40 | 87 | 69/31 | 0.34 | 144 |

In these runs, the proportion of AA actually incorporated into the styrene copolymer ran about 20 to 25% less than the proportion of AA in the feed.

The blends of these two styrene/acrylic acid copolymers with VAE were prepared in a Brabender at 180°-190° C. The mechanical property and Tg results are illustrated in Table 6.

TABLE 6

| Example | Sample Description | Tensile Modulus (psi) | Tensile Strength (psi) | Elongation @ Break (%) | Tg (DMS) |
|---|---|---|---|---|---|
| 23 | 50% S/AA (78/22) 50% VAE (70% VAc) | 182,000 | 5,200 | 12 | −14*,75 |
| 24 | 50% S/AA (69/31) 50% VAE (70% VAc) | 207,000 | 5,600 | 39 | −14,104 |

*Minor transition. The overall indication is that these polymers formed miscible blends.

EXAMPLE 25

A styrene/maleic anhydride copolymer (75% by wt styrene; obtained from Scientific Polymer Products, Inc.) was mixed in solution with VAE (70% VAc, also from Scientific Polymer Products, Inc.) (5 grams each). The solution was single phase (10% solids) and the cast film was transparent. The devolatilized solution was compression molded at 140° C., and exhibited a single Tg (31° C.) by DSC analysis. The mechanical properties on this transparent molded film are noted below and are characteristically brittle due to the low molecular weight of the styrene/maleic anhydride copolymer (which was too brittle to test).

Tensile Modulus = 96,000 psi
Tensile Strength = 21,000 psi
% Elongation at break = 5%

EXAMPLES 26–30

A series of (meth)acrylate/(meth)acrylic acid co- and terpolymers were evaluated in blends with vinyl acetate-ethylene (70% VAc; obtained from Scientific Polymer Products). The (meth)acrylate(meth)acrylic acid copolymer utilized in these Examples are noted in Table 7. Inherent viscosities were determined at 25° C. in tetrahydrofuran at 0.2 wt % solution. Tensile modulus values were obtained from compression molded plaques utilizing a procedure similar to ASTM D-638 adapted to small scale evaluation. Glass transition temperatures were determined via differential scanning calorimetry on a Perkin-Elmer DSC-2C at a heating rate of 10° C./minute.

TABLE 7

| Example | Composition | Feed Ratio | IV (dl/g) | Tg (°C.) | Tensile Modulus (psi) |
|---|---|---|---|---|---|
| 26 | EA/MAA | 75/25 | 0.52 | 44 | 110,000 |
| 27 | EA/MAA | 80/20 | 0.47 | 23 | 59,000 |
| 28 | n-BMA/EA/MAA | 43/43/14 | 0.39 | 29 | 33,000 |
| 29 | MMA/MAA* | 95/5 | | | |
| 30 | MMA/MAA* | 80/20 | | | |

*Obtained from Polysciences, Inc.; Warrington, PA
MAA = methacrylic acid
EA = ethyl acrylate
n-BMA = n-butyl methacrylate The results of solution blending experiments are noted in Table 8. No miscible systems were observed in this series.

TABLE 8

VAE (70% VAc)/(Meth)acrylate/(Meth)acrylic acid Copolymer Blend Study (Solution)

| Example | Blend Description | Solvent | Solution | Cast Film Appearance |
|---|---|---|---|---|
| 26 | 50% VAE 50% EA/MAA (75/25) | THF | Phase separated | Phase separated |
| 27 | 50% VAE 50% EA/MAA (80/20 by wt) | THF | Single phase | Phase separated |
| 28 | 50% VAE 50% n-BMA/EA/MAA (43/43/14) | THF | Hazy Solution | Phase separated |
| 29 | 50% VAE 50% MMA/MAA (95/5) | THF | Phase separated | Phase separated |
| 30 | 50% VAE 50% MMA/MAA (80/20) | THF | Phase separated | Phase separated |

Comparative Examples 26–30 show the non-equivalence of methacrylic acid and acrylic acid in formation of copolymers miscible with VAE.

EXAMPLES 31–41

Blends were made in a Brabender with various (meth)acrylate/(meth)acrylic acid co- and terpolymers with VAE (70% VAc: obtained from Scientific Polymer Products). The results on melt blended samples are listed in Table 9. The control poly(methyl acrylate) (Mw=43,000) and poly(ethyl acrylate) (Mw=95,000) were obtained from Scientific Polymer Products. The only blends exhibiting potential miscibility with VAE (70% VAc) were EA/AA (92/8 and 86/14 by wt) and n-BA/MAn (85/15). The Tg's of the VAE and EA/AA (86/14) were too close to ascertain whether the single phase behavior was observed. The EA/AA (92/8) yielded transparent samples with dynamic mechanical data indicating at least partial miscibility (single Tg behavior), however, again the Tg's of the constituents were too close to determine if a single Tg exists. Stretching the film did not reveal the whitening usually present for systems which are phase separated but are transparent due to matched refractive indices. The Tg data on the nBA/MAn noted below gave enough resolution to be able to assign a single Tg.

| | Tg(DSC) |
|---|---|
| n-BA/MAn (95/15) | −22° C. |
| VAE (70%,VA) | −9° C. |
| VAE/(nOBA/MAn) [50/50] | −15° C. |

TABLE 9

VAE (70% VAc)/(Meth)acrylate-(meth)acrylic acid
Co-and Terpolymer Blends (50/50 Blends)

| Examples | Polymer Blended with VAE | Feed Ratio | Brabender Blend Results |
|---|---|---|---|
| 31 | MMA/n-BMA/MAA | 30/50/20 | Phase separated |
| 32 | MMA/n-BMA/MAA | 26.5/43.5/30 | Phase separated |
| 33 | MMA/n-BMA/MAA | 22.5/37.5/40 | Phase separated |
| 34 | EA/AA | 75/25 | Phase separated |
| 35 | EA/AA | 86/14 | Transparent, homogeneous |
| 36 | EA/AA | 92/8 | Transparent, homogeneous |
| 37 | EA/AA | 65/35 | Phase separated |
| 38 | n-BA/MA/AA | 40/40/20 | Phase separated |
| 39 | n-BA/MAn | 85/15 | Transparent, homogeneous |
| 40 | EA | 100 | Phase separated |
| 41 | MA | 100 | Phase separated |

MMA = methyl methacrylate
n-BMA = n-butyl methacrylate
MAA = methacrylic acid
EA = ethyl acrylate
AA = acrylic acid
MAn = maleic anhydride
n-BA = n-butyl acrylate
MA = methyl acrylate The following are examples of sequential polymerization of acrylic acid containing copolymers in the presence of VAE emulsions. All percentages are by weight unless otherwise noted.

EXAMPLE 42

This example describes the blend of VAE (Airflex ®40 polymer emulsion from Air Products and Chemicals, Inc., 25 wt % ethylene) with a styrene-acrylic acid (S/AA) copolymer. The desired blend composition is 75% VAE, 25% S/AA where the S/AA composition is 80% styrene and 20% acrylic acid.

AIBN initiator (0.28 g) was dissolved in 32.18 g of styrene monomer. Then 11.29 g of acrylic acid was added and the resulting mixture was agitated to assist dissolution. The monomer initiator mixture was then added to 141.23 g of A-401 emulsion (55% solids) in a 500 mL glass reactor. The monomer/initiator solution was allowed to swell into the emulsion. Next, 100 g of water was added to dilute the emulsion. The pH was adjusted to 4 by the addition of a few drops of an ammonium hydroxide solution. The reactor was then heated to 70° C. with an external oil bath. After 4 hours, the reaction was cooled to room temperature and the product removed.

FI-IR confirmed the incorporation of styrene and acrylic acid functionality into the blend. Films cast directly from this emulsion were no more hazy than the unmodified emulsion. These films were stiffer than the starting material although they were still quite flexible. Dynamic mechanical spectroscopy of the resultant blend indicated a broad but single phase glass transition.

EXAMPLE 43

This example describes a sample of a similar overall composition as that described in Example 8 but which is prepared by mixing the individual emulsions of each copolymer.

First, an 80/20 styrene-acrylic acid copolymer was prepared by the emulsion copolymerization of 49.09 g of styrene with 14.7 g of acrylic acid. Sodium lauryl sulfate was used as the surfactant (1.53 g), potassium persulfate (0.17 g) as the initiator and ammonium hydroxide (dropwise) was used to adjust the pH to 4. Deoxygenated water (165 g) was used as the continuous phase. After polymerization, the material was found to contain both acrylic acid and styrene by FI-IR. This emulsion was found to contain 22% solids by weight.

The styrene-acrylic acid copolymer emulsions was then mixed with an A-401 VAE emulsion resulting in an overall ratio of 75% VAE to 25% S/AA. Thus, 62.8 g of A-401 (55% solids) was mixed with 56.8 g of the S/AA emulsion described above (22% solids). The resulting mixed emulsion was cast as a film and allowed to dry at room temperature. After drying, this film remained opaque white and exhibited poor flexibility. Dynamic mechanical analysis indicated the presence of 2 distinct phases, each with the characteristic glass transition of one of the two component copolymers. The comparison of Example 42 with Example 43 demonstrates the advantage of sequential polymerization to achieve a level of miscibility compared to emulsion mixture which did not allow for mixing approaching molecular scale dimensions. This example clearly shows that emulsion mixtures are not preferred and indeed, unless mixing occurs at the molecular scale, the property balance desired is not achieved.

EXAMPLE 44

This example describes the preparation of a blend of VAE (Airflex ®401 emulsion) with poly(ethyl acrylate-co-acrylic acid) by sequential polymerization. The desired blend composition is 50/50 and the desired ethyl acrylate/acrylic acid ratio is 80/20.

First, 137.4 g of an A-401 emulsion was diluted with 57.3 g of distilled water. A solution containing 57.28 g ethyl acrylate, 16.19 g acrylic acid and 0.81 g AIBN initiator was then added to the emulsion. After the addition of this solution, the emulsion was allowed to stir for 30 minutes to allow the dissolution of the monomers into the emulsion polymer. The emulsion/monomer mixture was then immersed in a 70° C. oil bath to initiate the polymerization. After ~15 minutes the reaction medium began to thicken noticeably and 200 mL of additional distilled water was added. Since the polymerization released enough energy to raise the reaction temperature to greater than the desired 70° C., the oil bath was lowered periodically to help control the reaction temperature. Before the reaction was complete, another 200 ml of distilled water was added to further reduce the viscosity. After 3 hours, the reaction was cooled to room temperature and the product removed. Cast films of this emulsion were not completely transparent and they were also quite tacky in texture as would be expected based upon the composition. No stability properties of the emulsion product were measured. The glass transition temperatures of the two component polymers were too close together to be of use in determining the phase characteristics of this blend.

EXAMPLE 45

This example describes the preparation of a blend of VAE (Airflex ® 465 polymer emulsion obtained from Air Products and Chemicals, Inc., 22 wt % ethylene) with a poly(ethyl acrylate-co-acrylic acid) by sequential polymerization. The desired blend composition is 50/50 and the desired ethyl acrylate/acrylic acid composition is 80/20. (The difference between this Example and Example 44 is the use of A-465 as the VAE component.)

A solution of 0.30 g AIBN initiator in 21.38 g of ethyl acrylate and 5.54 g of acrylic acid was prepared. This solution was added to 39.9 g of A-465 emulsion (66% solids) and allowed to stir for 15 minutes. 100 g of water was then added and the reaction was heated to 70° C. in an external oil bath. The reaction exotherm caused a temperature increase to 83° C., at which time the oil bath was lowered until the desired temperature was reestablished. After 2 hours at 70° C., the reaction temperature was raised to 80° C. for 1 hour to insure high monomer conversion. The reaction was then cooled to room temperature and the product removed.

Upon removal of the reaction product, it was noticed that some of the material had collected on the stirrer and thermometer in the reaction flask. The liquid phase was separated and the solid was dissolved in tetrahydrofuran. The liquid was used to cast films which had a similar appearance to those described in Example 44. The solid fraction of this product was incompletely soluble in THF.

EXAMPLE 46

A melt blend of the VAE (30% ethylene) with a styrene/maleic anhydride copolymer obtained from Arco Chemical Co. (Dylark: 232; 14% maleic anhydride by NMR analysis) was made in a brabender at 200°–220° C. Partial miscibility was noted from DMS analysis where a Tg of 85° C. was observed with a minor shoulder transition at 15° C. This indicates the major phase contains a miscible blend of styrene-maleic anhydride/VAE with a minor phase of VAE/styrene-maleic anhydride (rich in VAE).

EXAMPLE 47

This example describes the preparation of a blend of VAE (Airflex ® 401 emulsion) and a styrene-acrylic acid copolymer (S/AA). The desired blend composition was 80% VAE and 20% S/AA. The desired S/AA composition was 75% styrene and 25% acrylic acid.

A solution of 17.9 g of styrene and 6.4 g of acrylic acid was prepared. Next, 0.23 g of AIBN initiator was added to the monomer solution. This monomer/initiator solution was added in one portion to a 147 g quantity of A-401 emulsion which had been diluted with 238 g of deionized water. The emulsion was allowed to swell with the monomers for 10 minutes while stirred. This emulsion monomer mixture was then heated to 70° C. for 8 hours. The temperature was then increased to 80°–85° C. for 1 hour. The reaction was then cooled to room temperature and the product removed.

The same procedure was used to prepare a 40% S/AA, 60% VAE blend, also with a 75/25 S/AA composition.

Films were cast from the resulting products. These films dried transparent at room temperature and maintained their transparency after heating in a vacuum oven to 80° C. for 2 hours.

EXAMPLE 48

This example describes a blend of 60% styrene-acrylic acid copolymer with 40% VAE (Airflex ® 401 emulsion). The desired S/AA composition is 75% styrene and 25% acrylic acid.

A solution of 46.1 g of styrene, 15.1 g of acrylic acid and 0.61 g of AIBN was prepared. This monomer/initiator solution was added to 73.0 g of A-401 which had been diluted with 272 g of deionized water. The water had been deoxygenated by sparging with nitrogen for 30 minutes. The reaction mixture was heated to 70°–75° C. for 8 hours. At that point, all of the liquid had been absorbed from the reaction mixture. The product was dried in vacuum at 80° C. and resulted in a fine powder. This powder was compression molded at 130° C. and resulted in a partially transparent sample.

The above Examples 42–46 demonstrate that miscible blends of VAE and AA copolymers can be obtained by polymerizing the AA and its comonomer in a VAE emulsions. Preferably, in such a procedure, the blend has greater than 50 weight percent VAE because the AA polymerization should take place in the VAE polymer particles suspended in the emulsion rather than in the aqueous phase. Best results are obtained when the overall AA content of the blend is not over 15 weight percent.

EXAMPLES 49–57

Linear vinyl acetate-ethylene copolymers were prepared in t-butanol under pressure required to incorporate random copolymerization of ethylene monomer. Copolymer compositions and glass transition temperatures are summarized in Table 10.

TABLE 10

Compositions and Glass Transitions Temperatures For Vinyl Acetate-Ethylene (VAE) Copolymers Prepared Via Solution Polymerization

| Example | COMPOSITION[1] | $T_{g,onset}$ (°C.)[2] | $T_{g,mdpt}$ (°C.)[2] | SOURCE[3] | IV (dl/g)[4] |
|---|---|---|---|---|---|
| 49 | Poly(vinyl acetate) | 30 | 35 | SP[2] | 0.87 |
| 50 | VAE (94% VA) | 15 | 19 | APCI | 0.50 |
| 51 | VAE (88% VA) | 2 | 7 | APCI | 0.32 |
| 52 | VAE (75% VA) | −8 | −3 | APCI | 0.54 |
| 53 | VAE (75% VA) | −9 | −4 | APCI | 0.55 |
| 54 | VAE (70% VA) | −12 | −9 | SP[2] | 1.24 |
| 55 | VAE (65% VA) | −22 | −17 | APCI | 0.62 |
| 56 | VAE (65% VA) | −22 | −18 | APCI | 0.51 |
| 57 | VAE (50% VA) | −30 | −26 | SP[2] | 1.08 |

[1] Compositions determined via NMR.
[2] Glass transitions temperatures determined on 2$^{nd}$ heat.
[3] SP[2] = Scientific Polymer Products, Inc.
[4] Determined on a 0.2 wt % solution in THF at 25° C.
APCI = Air Products and Chemicals, Inc.

EXAMPLES 58–77

The following general procedure was used to prepare various acrylic acid-containing copolymers. A solution of the specified ethylenically unsaturated copolymerizable monomers and an initiator were added to the reaction solvent and the solution was deoxygenated by bubbling nitrogen into the solution for 5 minutes. The solution was then heated to 60° C. under nitrogen for 19 hours. The resulting copolymer was isolated by precipitating in water and drying in a vacuum oven (60° C./1 torr). Specific product yields and physical properties are outlined in Table 11. All products provided satisfactory spectral analyses.

TABLE 11

| Example | Monomers[1] | Composition (wt %) | IV (dl/g)[3] | Tg(°C.) |
|---|---|---|---|---|
| 58 | MA | 100 | — | 6 |
| 59 | EA | 100 | 0.39 | −16 |
| 60 | BA | 100 | 0.33 | — |
| 61 | 2-EHA | 100 | — | — |

TABLE 11-continued

| Example | Monomers[1] | Composition (wt %) | IV (dl/g)[3] | Tg(°C.) |
|---|---|---|---|---|
| 62 | MMA | 100 | 0.35 | 110 |
| 63 | MA/AA | 90/10 | 0.64 | 28 |
| 64 | MA/AA | 60/40 | 1.01 | 58 |
| 65 | MA/AA | 48/52 | 0.87 | 81 |
| 66 | EA/AA | 90/10 | 0.66 | 2 |
| 67 | EA/AA | 77/23 | 0.81 | 28 |
| 68 | EA/AA | 55/45 | 0.89 | 42 |
| 69 | BA/AA | 97/3 | 0.27 | — |
| 70 | BA/AA | 87/13 | 0.60 | −15 |
| 71 | BA/AA | 77/23 | 0.80 | 10 |
| 72 | BA/AA | 50/50 | 0.92 | 67 |
| 73 | 2-EHA/AA | 85/15 | 0.51 | — |
| 74 | 2-EHA/AA | 77/23 | 0.58 | 11 |
| 75 | 2-EHA/AA | 67/33 | 0.80 | 42 |
| 76 | MMA/AA | 92/8 | 0.42 | 117 |
| 77 | MMA/AA | 76/24 | 0.45 | 121 |

[1]MA = methyl acrylate, EA = ethyl acrylate, BA = n-butyl acrylate, 2-EHA = 2-ethylhexyl acrylate, MMA = methyl methacrylate, AA = acrylic acid.
[2]Determined by $^{13}$C NMR
[3]Determined on a 0.2 wt. % solution in THF at 25° C.

EXAMPLES 78-119

Two grams of each of the blend constituents was dissolved in sixty milliliters of tetrahydrofuran. The solution was then cast in a hood at room temperature for 48 hours. The film was dried in an air circulating oven for thirty minutes at 65° C. or at a temperature 30 to 40 degrees higher than the $T_g$'s of the blend constituents. The samples were then compression molded at 160° C. A sample of the molded plaque was placed in a Perkin-Elmer DSC-2C for glass transition temperature determination. Each sample was heated, rapidly cooled (at 320° C./min), and reheated from −50° C. to 140° C. at a heating rate of 10° C. per minute. The $T_g$ data reported corresponds to the midpoint values obtained from the baseline shift at the transition for the second heating. A blend demonstrating a single Tg independent from those of the blend constituents is sufficient evidence of thermodynamic polymer-polymer miscibility as described in Olabisi, et al., (supra). Results are given in Tables 12-17.

In each of Tables 12-17, the polymer phase behavior (PB) is indicated by the following code:
M = miscible (and thus mechanically compatible)
I = immiscible
MC = mechanically compatible
PM = poor mechanical compatibility.

Blends were categorized according to their thermal behavior, mechanical toughness and integrity as well as their appearance (e.g., transparency and uniformity) under tension.

TABLE 12

Differential Scanning Calorimetry (DSC) Results for Poly (Vinyl Acetate) and Vinyl Acetate-Ethylene Copolymer Blends with Poly(meth)acrylates ($T_g$ values in °C. represent midpoint values as obtained during $2^{nd}$ heat.)

| | | PBA | P(2-EHA) PB | PMA $T_g$ | PMA PB | PEA $T_g$ | PEA PB | PMMA $T_g$ | PMMA PB |
|---|---|---|---|---|---|---|---|---|---|
| Ex. | | | | | | | | | |
| 78 | Poly(vinylacetate) | I,PM | I,PM | 26 | M | 13,39 | I,PM | 27,93 | I,MC |
| 79 | VAE (50% VA) | I,PM | I,PM | 15 | M | −15,12 | I,PM | 8,90 | I,MC |
| 80 | VAE (88% VA) | I,PM | I,PM | 9 | M | −16,4 | I,PM | 3,86 | I,PM |
| 81 | VAE (75% VA) | I,PM | I,PM | 1,19 | I,PM | −14,0 | I,PM | −1,100 | I,PM |
| 82 | VAE (70% VA) | I,PM | I,PM | −10,21 | I,MC | −12 | I,MC | −14,105 | I,PM |
| 83 | VAE (65% VA) | I,PM | I,PM | −16,19 | I,PM | −15 | I,PM | −29,87 | I,PM |
| 84 | VAE (50% VA) | I,PM | I,PM | −28,15 | I,MC | −27,−14 | I,MC | −14,75 | I,PM |

P(2-EHA) — Poly(2-ethylhexyl acrylate)
PMA — Poly(methyl acrylate)
PEA — Poly(ethyl acrylate)
PMMA — Poly(methyl methacrylate)
PBA — Poly(n-butyl acrylate)

The data of Table 12 show that, with the exception of poly(methyl acrylate) which found miscible blends only with poly(vinyl acetate) and VAE containing 6 to 12% ethylene, all of the acrylate homopolymers were immiscible with VAE copolymers over a broad range, 6 to 50% of ethylene content.

TABLE 13

Differential Scanning Calorimetry (DSC) Results for Vinyl Acetate-Ethylene Copolymer Blends with Methyl Acrylate-Acrylic Acid (MA-AA) Copolymers ($T_g$ values in °C. represent midpoint values as obtained during $2^{nd}$ heat.) (PB indicates phase behavior.)

| Example | | MA-AA(10% AA) Tg | MA-AA(10% AA) PB | MA-AA(40% AA) Tg | MA-AA(40% AA) PB | MA-AA(52% AA) Tg | MA-AA(52% AA) PB |
|---|---|---|---|---|---|---|---|
| 85 | Poly(vinyl acetate) | 26 | I,MC | 29,39 | I,MC | 30,57 | I,MC |
| 86 | VAE(94% VA) | 9,19 | I,MC | 12,49 | I,PM | 1,42 | I,PM |
| 87 | VAE(88% VA) | 9,20 | I,PM | −2,33 | I,PM | 1,47 | I,PM |
| 88 | VAE(75% VA) | 0,27 | I,PM | −10.41 | I,PM | −15,42 | I,PM |
| 89 | VAE(70% VA) | −13,16 | I,PM | −25,34 | I,PM | −15,49 | I,PM |
| 90 | VAE(65% VA) | −28,17 | I,PM | −33,39 | I,PM | −31,46 | I,PM |
| 91 | VAE(50% VA) | −29,25 | I,PM | −36,36 | I,MC | −17,43 | I,PM |

The data of Table 13 show that the MA/AA copolymer over a broad content of AA, is immiscible with VAE. This is an interesting result since both poly(methyl acrylate) and MA/AA (10% AA) are miscible with poly (vinyl acetate). The incorporation of AA into a methyl acrylate polymer appears to decrease its miscibility with VAE.

TABLE 14

Differential Scanning Calorimetry (DSC) Results for Vinyl Acetate-Ethylene Copolymer Blends with Methyl Acrylate-Acrylic Acid (EA-AA) Copolymers ($T_g$ values in °C. represent midpoint values as obtained during $2^{nd}$ heat.) (PB indicates phase behavior.)

| Example | | EA-AA(10% AA) | | EA-AA(23% AA) | | EA-AA(45% AA) | |
|---|---|---|---|---|---|---|---|
| | | Tg | PB | Tg | PB | Tg | PB |
| 92 | Poly(vinyl acetate) | 14 | M | 32 | M | 30,43 | I,MC |
| 93 | VAE(94% VA) | 11 | M | 17 | M | 3,27 | I,PM |
| 94 | VAE(88% VA) | 4 | M | 13 | M | 3,34 | I,PM |
| 95 | VAE(75% VA) | 3 | M | −1,24 | I,MC | −11,35 | I,PM |
| 96 | VAE(70% VA) | −11,0 | I,MC | −9,26 | I,MC | −20,35 | I,PM |
| 97 | VAE(65% VA) | −14,5 | I,PM | −15,26 | I,PM | −23,39 | I,PM |
| 98 | VAE(50% VA) | −27,−1 | I,MC | −28,22 | I,MC | −32,45 | I,PM |

The data of Table 14 show a window of miscibility for VAE and EA/AA copolymer having 10% and 23% AA. These miscible blends contained VAE having ethylene contents from 6% up to 25%. Even at 30% ethylene, mechanical compatibility is indicated but at higher ethylene content (35%) the VAE's showed poor mechanical compatibility with all the EA/AA copolymers tested.

TABLE 15

Differential Scanning Calorimetry (DSC) Results for Vinyl Acetate-Ethylene Copolymer Blends with n-Butyl Acrylate-Acrylic Acid (BA-AA) Copolymers ($T_g$ values in °C. represent midpoint values as obtained during $2^{nd}$ heat.) (PB indicates phase behavior)

| Ex. | | BA-AA (6% AA) PB | BA-AA (13% AA) | | BA-AA (23% AA) | | BA-AA (50% AA) | |
|---|---|---|---|---|---|---|---|---|
| | | | $T_g$ | PB | $T_g$ | PB | $T_g$ | PB |
| 99 | Poly(vinyl acetate) | I,PM | −31,34 | I,PM | 7,37 | I,MC | 35 | I,MC |
| 100 | VAE (94% VA) | I,PM | −27,12 | I,PM | 14 | M | 15,34 | I,PM |
| 101 | VAE (88% VA) | I,PM | −18,14 | I,MC | 10 | M | 9,32 | I,PM |
| 102 | VAE (75% VA) | I,PM | −19,1 | I,MC | 2 | M | 2,56 | I,PM |
| 103 | VAE (70% VA) | I,PM | −14 | M | −9,14 | I,MC | −20,22 | I,PM |
| 104 | VAE (65% VA) | I,PM | −18 | I,MC | −16,−17 | I,PM | −20,43 | I,PM |
| 105 | VAE (50% VA) | I,PM | −25 | I,MC | −26 | I,MC | −27,52 | I,PM |

The data of Table 15 show that the miscibility window for VAE and n-BA/AA copolymers is even smaller than it is for EA/AA. Note that these copolymers were all immiscible with poly(vinyl acetate) but at the 23% AA level were miscible VAE's having 6 to 25% ethylene and at 13% AA the n-BA/AA copolymer was miscible with VAE having 30% ethylene. Phase separation had previously been observed in an attempt to solution blend in THF a 50/50 mixture of VAE (30% ethylene) and n-BA/AA (20% AA). This appears consistent with the immiscibility shown in Table 15 for VAE (30% ethylene) and BA/AA (23% AA).

TABLE 16

Differential Scanning Calorimetry (DSC) Results for Vinyl Acetate-Ethylene Copolymer Blends with 2-Ethylhexyl Acrylate-Acrylic Acid (2-EHA-AA) Copolymers ($T_g$ values in °C. represent midpoint values as obtained during $2^{nd}$ heat.) (PB indicates phase behavior.)

| Example | | 2-EHA-AA(15% AA) | | 2-EHA-AA(23% AA) | | 2-EHA-AA(33% AA) | |
|---|---|---|---|---|---|---|---|
| | | Tg | PB | Tg | PB | Tg | PB |
| 106 | Poly(vinyl acetate) | 25 | I,PM | 30 | I,PM | 30,43 | I,MC |
| 107 | VAE(94% VA) | −25,9 | I,PM | 23 | M | 16 | I,MC |
| 108 | VAE(88% VA) | −23,7 | I,PM | 18 | M | 15,32 | I,MC |
| 109 | VAE(75% VA) | −26,1 | I,MC | 4 | M | 1,32 | I,MC |
| 110 | VAE(70% VA) | −11 | I,MC | −7,20 | I,MC | −10,36 | I,PM |
| 111 | VAE(65% VA) | −18 | I,MC | −15,14 | I,PM | −16 | I,PM |
| 112 | VAE(50% VA) | −26 | I,MC | −24 | I,PM | −27 | I,PM |

The data of Table 16 show a small window of miscibility for VAE (6 to about 30% ethylene) and 2-EHA/AA (23% AA). Again, this is surprising since all of the 2-EHA/AA copolymers were immiscible with poly(vinyl acetate).

TABLE 17

Differential Scanning Calorimetry (DSC) Results for Vinyl Acetate-Ethylene Copolymer Blends with 2-Ethylhexyl Acrylate-Acrylic Acid (MMA-AA) Copolymers ($T_g$ values in °C. represent midpoint values as obtained during $2^{nd}$ heat.) (PB indicates phase behavior.)

| Example | | MMA-AA(8% AA) | | MMA-AA (24% AA) | |
|---|---|---|---|---|---|
| | | Tg | PB | Tg | PB |
| 113 | Poly(vinyl acetate) | 43,96 | I,MC | 39,103 | I,MC |
| 114 | VAE (94% VA) | 22,109 | I,MC | 24,118 | I,MC |
| 115 | VAE | 17,106 | I,MC | 18,113 | I,PM |

TABLE 17-continued

Differential Scanning Calorimetry (DSC) Results for Vinyl Acetate-Ethylene Copolymer Blends with 2-Ethylhexyl Acrylate-Acrylic Acid (MMA-AA) Copolymers
($T_g$ values in °C. represent midpoint values as obtained during $2^{nd}$ heat.) (PB indicates phase behavior.)

| Example | | MMA-AA(8% AA) | | MMA-AA (24% AA) | |
|---|---|---|---|---|---|
| | | Tg | PB | Tg | PB |
| 116 | VAE (88% VA) | 3,113 | I,PM | −1,104 | I,PM |
| 117 | VAE (75% VA) | −5,118 | I,PM | −9,109 | I,PM |
| 118 | VAE (70% VA) | −18,109 | I,PM | −24,97 | I,PM |
| 119 | VAE (65% VA) | −28,111 | I,PM | −28,97 | I,PM |
| | VAE (50% VA) | | | | |

It was indicated before in Examples 29 and 30 that MMA/MAA copolymers were immiscible with VAE (30% ethylene). The data of Table 17 show that MMA-/AA copolymers (8 and 24% AA) are immiscible with VAE over a broad range of ethylene contents.

EXAMPLE 120

Six grams of VAE (30 wt % ethylene $T_g = -9°$ C.), obtained from Scientific Polymer Products) and six grams of 2-ethylhexyl acrylate/maleic anhydride (14 wt % maleic anhydride, prepared as described in Examples 8-16) were dissolved in ninety grams of tetrahydrofuran. The blended material was recovered from solution and analyzed in accord with the procedure described in Examples 78-119. The blended material demonstrates miscibility by exhibiting a single Tg of −17° C.

The miscible blends of this invention can be further modified by incorporating plasticizers and other modifiers which are commonly used with poly(vinyl chloride) or poly(vinyl acetate). Also, the blends can be used with reinforcing agents such as fiberglass, carbon fibers and the like. Additives such as pigments, stabilizers, tackifiers, flame retardants can also be used as is customary in compounding a polymeric material for specific end uses.

The miscible blends of this invention find use in molding compositions and structures such as felt and in compounded formulations such as coatings, emulsions and adhesives. Formation of the miscible blends by polymerization of the acrylic acid copolymer in the presence of a vinyl acetate/ethylene emulsion is of particular interest in providing a water-based polymer blend which can be used as a coating, in adhesives or for caulking applications.

Other advantages and features of our invention will be apparent to those skilled in the art from the foregoing disclosure without departing from the spirit or scope of our invention.

We claim:

1. A polymeric composition containing a miscible blend of copolymers consisting essentially of
   (a) a copolymer of vinyl acetate and ethylene having an ethylene content in the range of 5 to 30 weight percent, and
   (b) a copolymer of acrylic acid selected from the group consisting of
      (i) a copolymer consisting essentially of styrene and 8 to 22 weight percent acrylic acid,
      (ii) a copolymer consisting essentially of ethyl acrylate and 8 to 25 weight percent acrylic acid,
      (iii) a copolymer consisting essentially of n-butyl acrylate and 10 to 25 weight percent of acrylic acid and
      (iv) a copolymer consisting essentially of 2-ethylhexyl acrylate and 14 to 25 weight percent acrylic acid.

2. The composition of claim 1 wherein said copolymer (a) contains 6 to 25% ethylene and said copolymer (b) is a copolymer of ethyl acrylate and acrylic acid containing 10 to 15% acrylic acid.

3. The composition of claim 1 wherein said copolymer (a) contains 6 to 25% ethylene and said copolymer (b) is a copolymer of n-butyl acrylate and acrylic acid containing 18 to 25% acrylic acid.

4. The composition of claim 1 wherein said copolymer (a) contains 6 to 25% ethylene and said copolymer (b) is a copolymer of 2-ethylhexyl acrylate and acrylic acid containing 18 to 25% acrylic acid.

5. The composition of claim 1 wherein said copolymer (b) is a copolymer of styrene and acrylic acid.

6. The composition of claim 1 wherein said miscible blend contains 10 to 90 parts by weight of copolymer (a) and 90 to 10 parts by weight of copolymer (b).

7. The composition of claim 5 wherein said copolymer of styrene and acrylic acid contains a minor amount of 2-ethylhexyl acrylate.

8. The composition of claim 1 wherein said miscible blend of copolymers exhibits a single glass transition temperature (Tg).

9. A polymeric composition containing a miscible blend consisting essentially of vinyl acetate/ethylene copolymer having an ethylene content of 10 to 35 weight percent and a styrene/acrylic acid copolymer having an acrylic acid content of 8 to 22 weight percent.

* * * * *